(12) United States Patent
Kiener et al.

(10) Patent No.: US 7,992,664 B2
(45) Date of Patent: Aug. 9, 2011

(54) JALOUSIE FOR A VEHICLE

(75) Inventors: Albert Kiener, Mollis (CH); Josef Küsperth, Schwanden (CH)

(73) Assignee: Kunststoff Schwanden AG, Schwanden (SE)

( * ) Notice: Subject to any disclaimer, the term of this patent is extended or adjusted under 35 U.S.C. 154(b) by 436 days.

(21) Appl. No.: 12/235,655

(22) Filed: Sep. 23, 2008

(65) Prior Publication Data
US 2010/0071976 A1 Mar. 25, 2010

(51) Int. Cl.
B60K 11/04 (2006.01)
B60K 11/08 (2006.01)

(52) U.S. Cl. ..................... 180/68.1; 180/68.4

(58) Field of Classification Search ............. 180/68.1, 180/68.2, 68.4; B60K 11/04, 11/08
See application file for complete search history.

(56) References Cited

U.S. PATENT DOCUMENTS

| 1,114,246 A * | 10/1914 | Purber ........................ 236/35.2 |
| 1,257,218 A * | 2/1918 | Griswold .................... 123/41.58 |
| 2,162,526 A * | 6/1939 | Buyck ............................ 165/44 |
| 2,170,524 A * | 8/1939 | Agerell et al. ............... 180/68.6 |
| 2,174,358 A * | 9/1939 | Blumenthal .................... 165/98 |
| 2,248,544 A * | 7/1941 | Maruhn ...................... 123/27 R |
| 2,276,279 A * | 3/1942 | Asklund ...................... 180/68.1 |
| 4,387,563 A * | 6/1983 | Bell, III ...................... 60/39.25 |
| 4,410,032 A * | 10/1983 | Mori .............................. 165/44 |
| 4,457,558 A * | 7/1984 | Ishikawa .................... 296/180.5 |
| 4,779,577 A * | 10/1988 | Ritter et al. ................ 123/41.05 |
| 4,924,826 A * | 5/1990 | Vinson ...................... 123/195 C |
| 4,938,303 A * | 7/1990 | Schaal et al. ............... 180/68.1 |
| 5,701,854 A * | 12/1997 | Hauser ...................... 123/41.49 |
| 5,732,666 A * | 3/1998 | Lee ........................... 123/41.05 |
| 5,735,137 A * | 4/1998 | Kim .............................. 62/410 |
| 6,164,909 A * | 12/2000 | Ehlers et al. ............... 415/208.1 |
| 6,230,832 B1 * | 5/2001 | von Mayenburg et al. ... 180/68.1 |
| 6,695,047 B2 * | 2/2004 | Brocksopp .................... 165/292 |
| 6,979,050 B2 * | 12/2005 | Browne et al. ............. 296/180.5 |
| 7,498,926 B2 * | 3/2009 | Browne et al. ............. 340/425.5 |
| 2003/0029581 A1 * | 2/2003 | Vide ............................ 160/201 |
| 2006/0060401 A1 * | 3/2006 | Bole ........................... 180/68.1 |
| 2006/0095178 A1 * | 5/2006 | Guilfoyle et al. ............. 701/36 |
| 2006/0102399 A1 * | 5/2006 | Guilfoyle et al. ........... 180/68.1 |
| 2008/0133090 A1 * | 6/2008 | Browne et al. ................ 701/49 |
| 2009/0050385 A1 * | 2/2009 | Guilfoyle et al. ........... 180/68.1 |
| 2009/0057043 A1 * | 3/2009 | Robinson ................... 180/68.1 |
| 2009/0060739 A1 * | 3/2009 | Robinson ....................... 416/39 |

FOREIGN PATENT DOCUMENTS

| DE | 3905349 A1 * | 9/1989 |
| DE | 4414893 A1 * | 11/1995 |
| DE | 10047952 A1 * | 4/2002 |
| DE | 102005021676 A1 * | 11/2006 |
| GB | 913147 A * | 12/1962 |

* cited by examiner

*Primary Examiner* — Hau V Phan
*Assistant Examiner* — Jacob Meyer
(74) *Attorney, Agent, or Firm* — Ladas & Parry LLP

(57) ABSTRACT

The jalousie for the control of the air flow through the engine cooler of a vehicle has rotatable fins (2), which are supported on one side in an outer housing ring (47) provided for the connection with the engine cooler of the vehicle and on the other side in an inner supporting ring (4). The swivelling of the fins (2) occurs with an adjusting ring (45), whose engaging portions (46) work together with counter-engaging portions (10) provided at the fin ends. The adjusting ring (45) with its engaging portions (46) and the counter-engaging portions (10) of the fins (2) are enclosed together on all sides in a hollow space (49) circumferentially extending around along the adjusting ring (13, 45) for the protection against contaminants and consequently for its safe function, which is limited by two profile rings (47, 50) interlocking with each other all around.

10 Claims, 7 Drawing Sheets

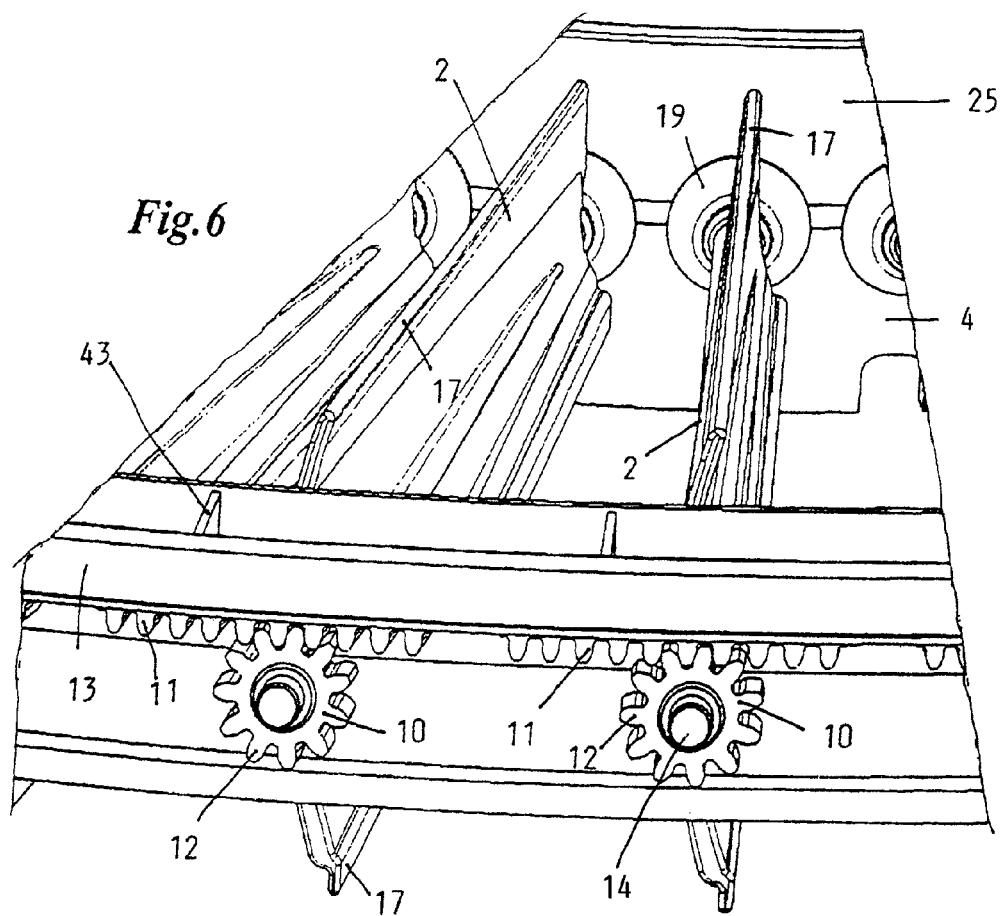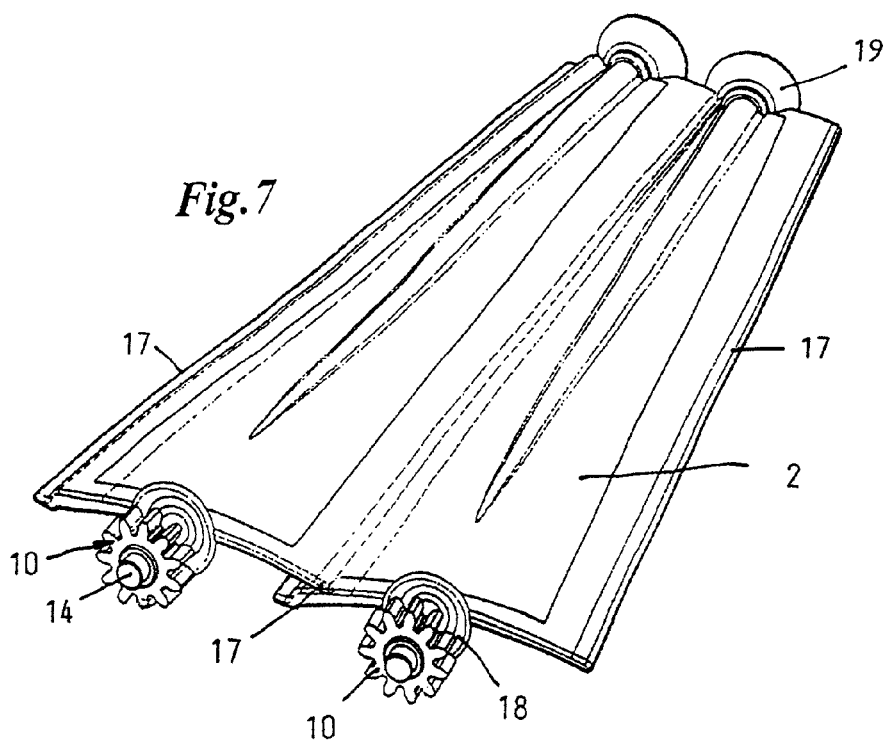

JALOUSIE FOR A VEHICLE

TECHNICAL FIELD

The invention relates to a jalousie for controlling the airflow through the engine cooler of a vehicle, whose fins are supported rotatable in an outer housing ring determined for the connection to the engine cooler of the automobile on one side and in an inner supporting ring on the other side, whereat the fins have at one of their ends counter-engaging means for engaging means for their swivel drive, which are provided in a circumferentially extending adjusting ring movable in circumferential direction.

BACKGROUND ART

A jalousie of this type is, for example, known through DE-3905349. Such a jalousie causes in closed condition faster heating of the engine of the automobile after the start and consequently reaches an operating condition faster with better degree of efficiency and lesser wear and tear. Further, the engine noise reaching the surroundings of the vehicle from the engine compartment is reduced by the closed jalousie. Moreover, the flow resistance or the drag coefficient of the vehicle is improved by the closed jalousie, because the airflow against the front-sided engine cooler cannot flow with corresponding flow resistance through this and further through a part of the engine compartment.

The swivel drive of the fins of the known engine cooler jalousies occurs respectively via a swivel lever projecting away radially from its bearing pin, which engages with an end-sided swivel pin in a circumferentially extending common adjusting ring. Since the swivel pins of the fins move along a circular arc accordingly, their coupling with the adjusting ring causes either the execution of a lifting movement of the adjusting ring or causes the need for incorporation of an axially directed slot in the adjusting ring respectively opening into the flow channel for the swivel pins. Consequently, a relatively longer displacement results for the swivel pins and correspondingly for the adjusting ring for the swivelling of the fins by 90°, with unfavourably changing effective lever length of the swivel lever thereby.

Known jalousies have the further disadvantage that fine sand and other dirt particles from the air flowing against the vehicle and through the engine cooler can deposit and accumulate in free spaces of the adjusting mechanism and even freeze there. This can lead to the blockade of such prior art adjusting mechanism by complete filling up of these free spaces.

Problems to be Solved by the Invention

The invention is based on the task to improve a jalousie of the type mentioned at the beginning in such a way that its fins can be swivelled reliably and easily with relatively small force even with loading of the jalousie through contaminations. Moreover, it should be possible to manufacture such a jalousie with relatively higher stiffness and low weight by simple and consequently economical methods. Moreover, it should enable advantageous embodiments of the jalousie in all respects.

Means for Solving the Problem

This problem is solved according to the invention by the counter-engaging means and the engaging means being included on all sides in a common hollow space circumferentially extending along the adjusting ring.

For an easily producible and particularly space saving implementation of such an inclusion of the engagement area, the engaging means of the adjusting ring consists of teeth arranged in series in circular direction, which are in intermeshing engagement with a toothed engagement area running in the form of a circular arc of a steering head forming the counter-engaging means, in the preferred embodiment of the invention.

In order to ensure that fine dust particles that has entered, in spite of the closed design of the hollow space containing the engagement area according to the invention, leaves the hollow space again automatically, the circumferentially extending hollow space containing the engagement area is connected to a channel circumferentially extending parallel to that and opened into an outlet area at least in the lowest area of the jalousie through several openings. Preferably, these openings are provided respectively between neighbouring teeth of the toothed engaging means in the circumferential direction.

In a further preferred embodiment of the invention, the engaging means of the adjusting ring remains in permanent engagement with the counter-engaging means of these fins for a larger number of fins, while only a temporary engagement with the engaging means of the adjusting ring is provided for a smaller number of fins so that the latter can be swivelled to open position automatically in the airflow or due to the back pressure of the air flowing through the engine cooler.

Further advantageous embodiments of the invention are subject of the dependent patent claims and are represented with their advantages in the following description of embodiments based on the drawings.

DETAILED DESCRIPTION OF EMBODIMENTS OF THE INVENTION

Figure 1:
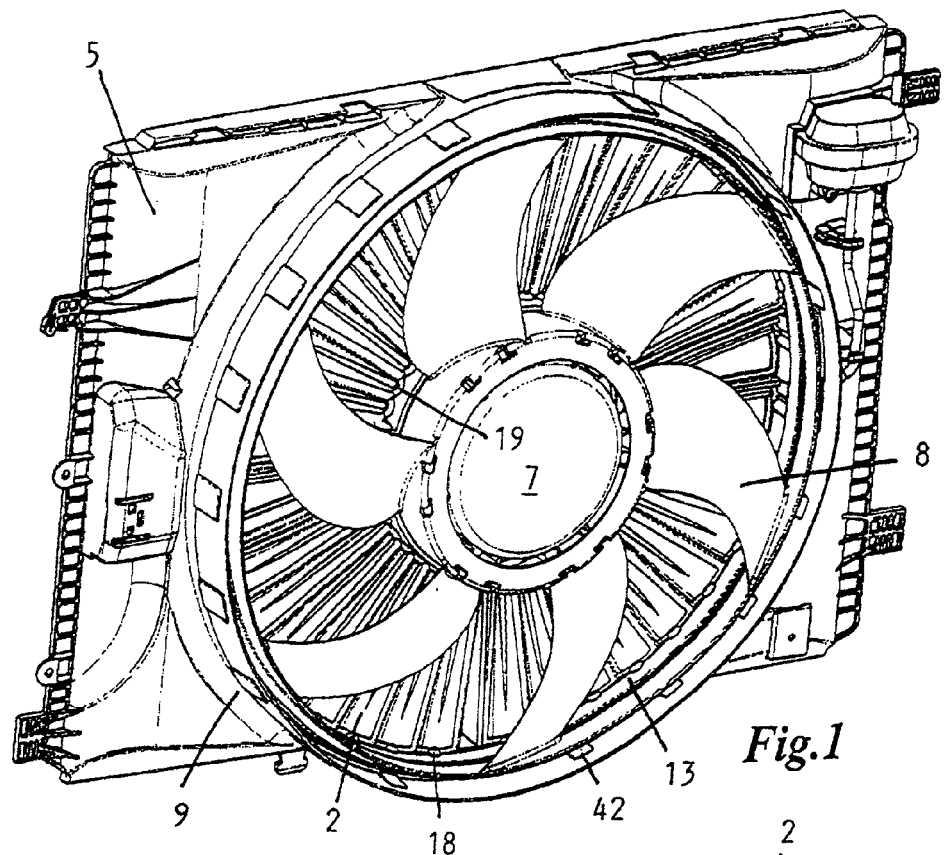
FIG. 1 a jalousie according to the invention in a module with an engine cooler shroud and the paddle wheel of a cooling fan, FIG. 2 a representation of a sector-pattern cut-out area of the jalousie according to fig.1, FIG. 3 an enlarged representation of an area of the FIG. 2, FIG. 4 a jalousie for the arrangement according to FIG. 1, FIG. 5 an asymmetric fin of the jalousie according to FIG. 4 automatically rotatable in the airflow, FIG. 6 a representation of a sector-pattern cut-out of a jalousie according to FIGS. 2 to 4, FIG. 7 two fins of the jalousie according to FIGS. 2 to 4 lying adjacent to each other in sealing position, FIG. 8 a sector-pattern cut out area of a further embodiment of a jalousie according to the invention, FIG. 9 an enlarged representation of an area of the jalousie according to FIG. 8, FIG. 10 a perspective view of a cut-out circumferential area of a further embodiment of a jalousie according to the invention in the area of fins remaining temporarily in engagement with an adjusting ring, FIG. 11 a view of an end of a fin of the representation of FIG. 10 having an engagement cam, FIG. 12 a representation corresponding to FIG. 10 with the adjusting ring in opened adjustment position, FIG. 13 a representation corresponding to FIG. 11 or 12 with the adjusting ring in disengaging position of these fins, FIG. 14 a total view of a jalousie with some fins according to FIGS. 10 to 13 mounted on an engine cooler shroud and FIG. 15 an enlarged perspective view of a cut-out of lower area of the jalousie according to FIG. 14 with chamber ring removed.

The jalousie 1 has many ring-shaped fins 2, 22 arranged next to each other and radially directed. These are supported in the area of their outer end in an outer housing ring 3 and at their inner end in a supporting ring 4 fixed rotatable around a geometric axis connecting both bearing positions with each other. For that, the outer housing ring 3 can be a single-piece component of an engine cooler shroud 5, which serves for the receiving of the electric motor 7 of a cooling fan 8 with its central area 6 or it has a snug fit in a pipe-shaped extension 9 of the engine cooler shroud 5 corresponding to the representation in FIGS. 2 and 3 so that this forms an adapter for matching to certain engine cooler dimensions respectively.

For the continuously controlled movement of the fins 2 from a tightly closed position which reduces the drag of a vehicle to a completely opened position, these have at their radial outer end a steering head 10, preferably made in one piece, with a toothed engagement area in the shape of a circular arch corresponding to the form of a gear either rotating fully or partially in the form of circular sector. This is in an intermeshing engagement with a toothed circumferential area 11 of adjusting ring 13 guided rotatably on the outer housing ring 3.

An electrically, pneumatically or hydraulically operated servo drive is provided between a circumferential location of the adjusting ring 13 and the engine cooler shroud 5 (not shown here) for its displacement or adjusting rotation and the swivelling of the controllable fins 2 with it, depending on the signal of a, e.g., sensor placed in the cooling water flow of the engine cooler. Based on the invention, this requires only a short, essentially straight displacement by about 90° corresponding to a rotation of the adjusting ring 13, e.g., by only about 3°, for the swivelling of the fins 2 from a completely opened position corresponding to the representation in FIG. 6 to the closed position corresponding to the representations in FIG. 2 or 7.

The fins 2, 22 with their bearing journals 14, 15 provided for the rotatable bearing, their drive shaft 16, their steering head 10 and an elastic fin edge 17 and a cap-shaped sealing collar 18, 19 adjacent to this can be manufactured advantageously without intermediate ejection in reciprocal allocation suitable for assembly in a common injection mould.

For the subsequent assembly, the fins 2, 22 are inserted in essentially u-shaped bearing recesses 20, 21 of the outer housing ring 3 and the inner supporting ring 4. Besides, the outer bearing journals 14 of the fins 2 engage respectively in a bearing opening 40 corresponding to the embodiment according to FIG. 3, which is provided outside of two cross-sectional sides 23, 24 of a u-shaped cross-section of the housing ring 3. A further resting engagement can take place within the u-shaped bearing openings 20, 21 also by means of the axis piece 16 and the inner bearing journal 15, in which these are narrowed outside slightly.

For the locking of the inner bearing journals 15 in a bearing recess 21, the inner supporting ring 4 can be executed in two pieces and consequently have a retaining ring 25 additionally. An additional locking of the axis piece 16 in the bearing recess 20 of the outer housing ring 3 occurs corresponding to the representation in FIG. 2 and 3 through the adjusting ring 13 adjacent to the housing ring 3.

The toothed steering head 10 of the fins 2 is consequently included between the two cross-sectional sides 23,24 of the housing ring 3. The outward closure arises through the adjusting ring 13 sliding on the housing ring 3. This is held rotatable through latches 42 provided at equal intervals at the inside of the housing ring 3. It has a u-shaped hollow section in the cross-section opening outwards and is strengthened dimensionally stable through bridges 43 provided at equal intervals.

The adjusting ring 13 encompasses the cross-sectional sides 23, 24 of the housing ring 3 by means of recesses 26, 26' u-shaped in cross-section respectively for an additional sealing against penetrating contaminations such as a labyrinth seal. It is understood that cross-sectional sides of the adjusting ring 13 can engage in corresponding recesses of the housing ring 3 in a reversed arrangement, not represented here.

For an improved sealing effect of the jalousie 1, an elastic fin edge 17 stretches at least along the fin edge lying on an adjacent fin 2, which is formed integrally on the fin 2, 22 consisting of stiff material in the injection moulding process. Preferably, this elastic fin edge 27 merges integrally in the area of the fin end into sealing collars 18, 19 forming a sealing lip 28 cap-shaped resting tightly against the outer housing ring 3 and the adjusting ring 13 on one side and against the inner supporting ring 4 on the other side. This causes an improved sealing of the components required for the adjusting of the fins 2, i.e., the fin bearing and the adjusting mechanism including the adjusting ring 8, against dust and moisture. Further, the sealing collar 18, 19 formed on the fins 2 achieves noise reduction. Moreover, they serve for the tolerance compensation for a playfree mounting in axial direction and sealing of the fins 2 against the housing ring 3 and the supporting ring 4.

Figure 8:
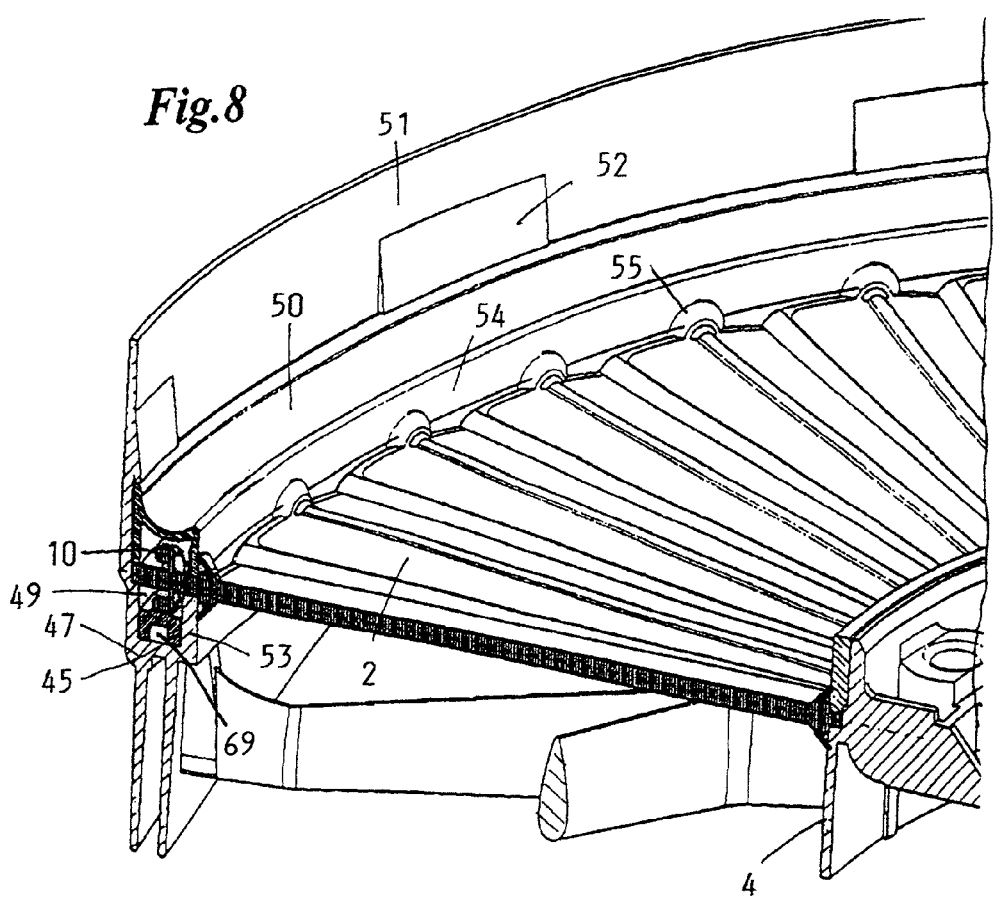
Figure 9:
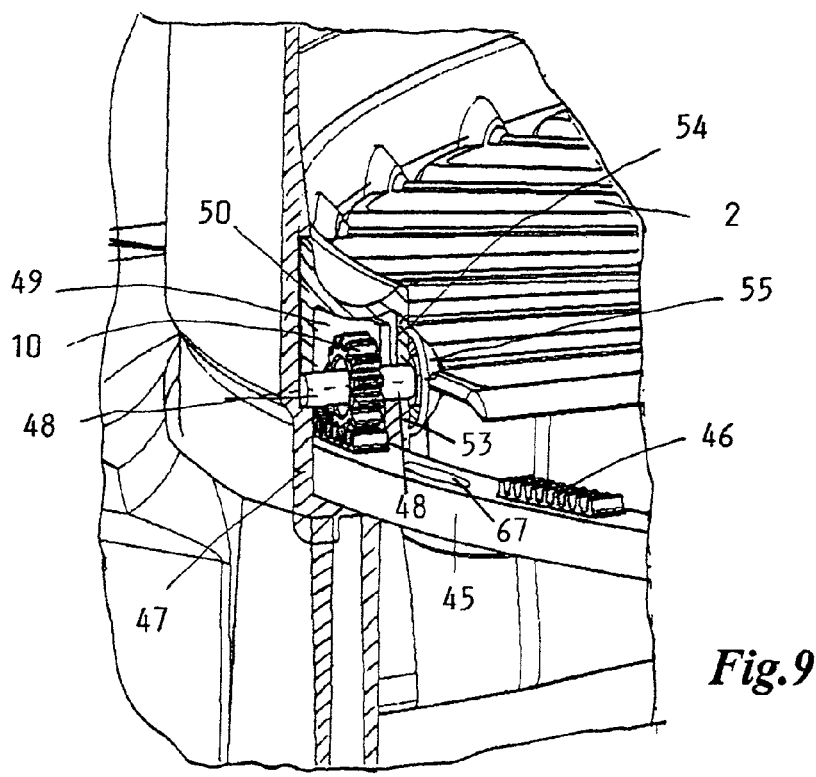

In a further embodiment of a jalousie according to the invention corresponding to the representations in FIGS. 8 and 9, an adjusting ring 45 with engagement means 46 in the form of racks in series is included in a channel-shaped area of the housing ring 47 so that it is arranged in the flow direction or axial direction of the jalousie between the housing ring 47 and the fin axes 48. Consequently, the adjusting ring 45 is enclosed tightly in a circumferentially extending hollow space 49, which is limited on one side by the channel-shaped area of the housing ring 47 and on the other side by an additional chamber ring 50, which are in tight engagement with each other.

Several latches 52 are formed in the inner side of a cylindrical wall 51 of the housing ring 47 forming part of an engine cooler shroud in circumferential direction, behind which the chamber ring 50 is rested so that it rests tightly against the housing ring 47.

The driving shafts 48 are inserted in cut-outs of the inner cross-sectional side 53 of the housing ring 47, which are closed outwards through the inner cross-sectional side 54 of the chamber ring 50 formed as hollow profile so that the chamber ring 50 forms an outer bearing shell for the drive shafts 48 of the fins 2.

As already shown for the first embodiment, the bearing area of the drive shafts 48 is surrounded by a sealing collar 55 so that this rests against the cross-sectional sides 53 and 54 of the housing ring 47 and the chamber ring 50 abutting each other is leak-proof.

Figure 4:
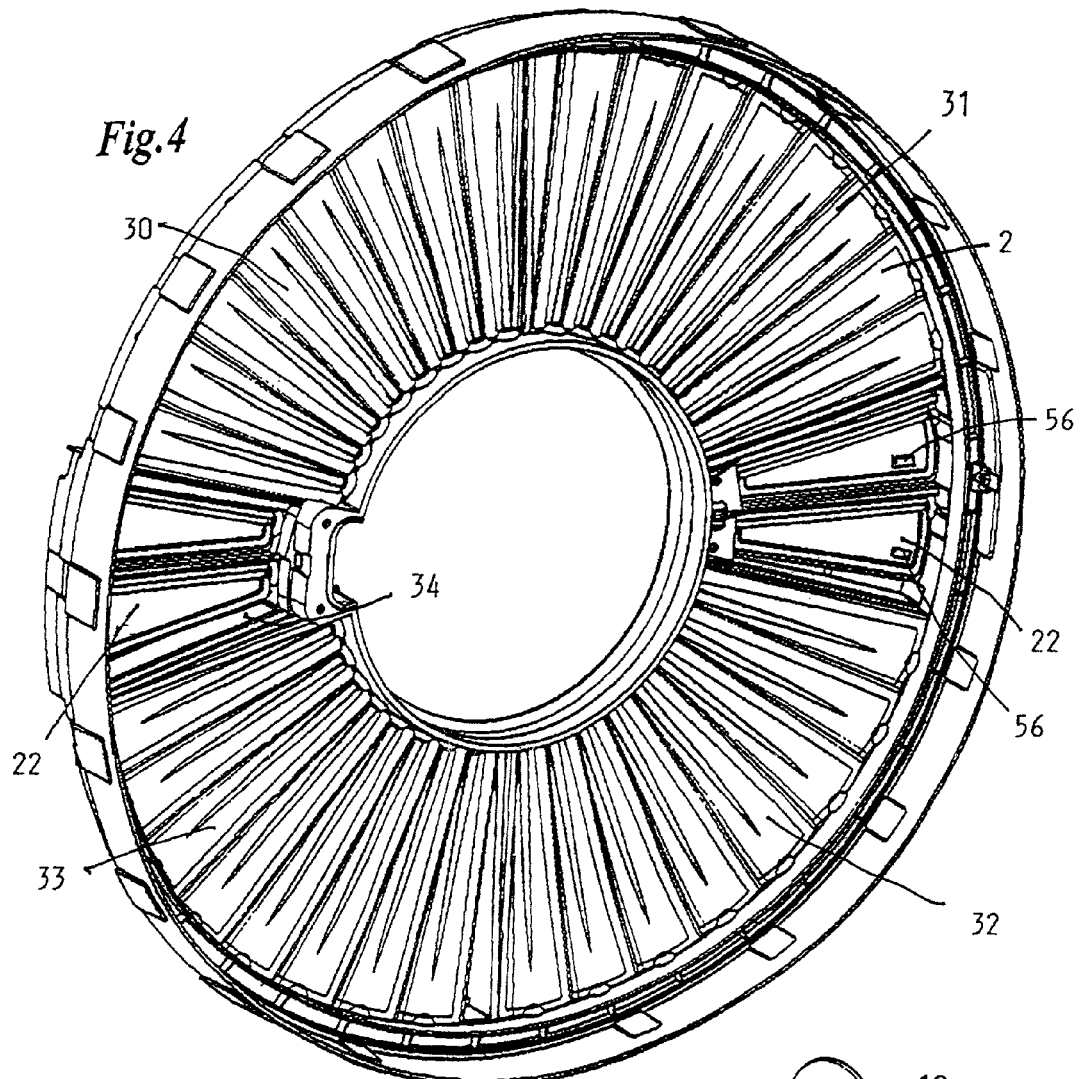
Figure 14:
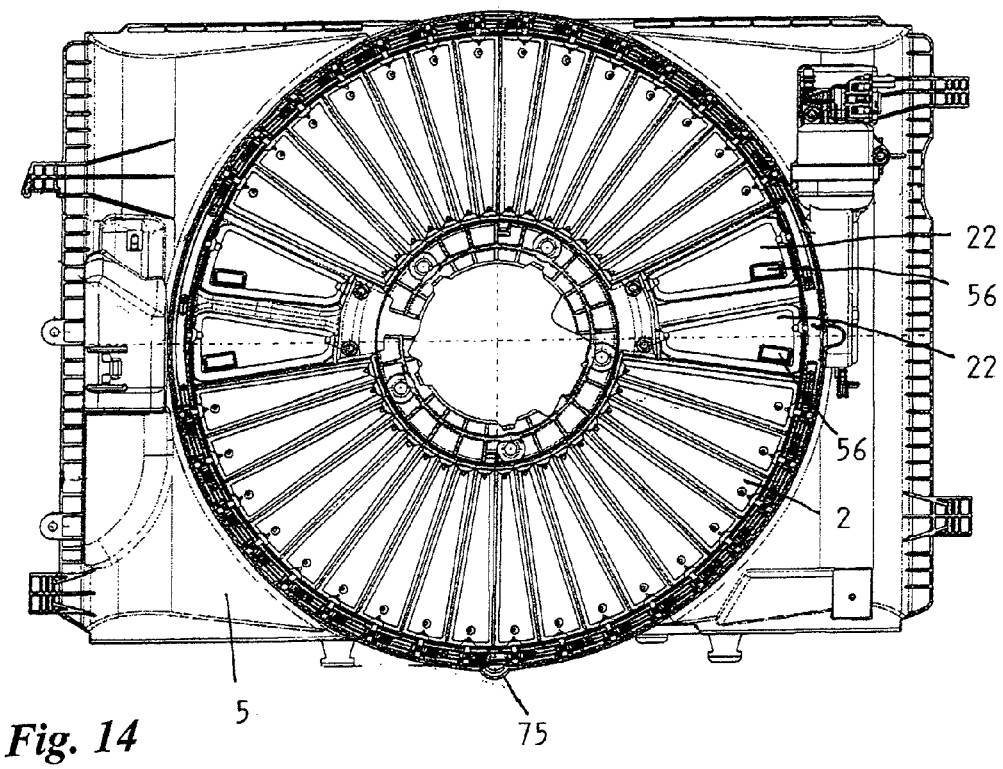

In a special embodiment of the invention, at least one fin 22 is provided in addition to the fins 2 continuously variable in their adjusted position by means of an servo drive corresponding to the representations in FIG. 4 and FIG. 14, which can be swivelled freely and is held automatically in closed position either through its own weight in asymmetrical execution or through connection to an external weight 56 so that it is held swivelled in opened position automatically only for the driving through the back pressure of a travelling airflow. In this way, a mostly sufficient, essentially limited flowing through of the engine cooler and a corresponding improvement of the drag coefficient of the vehicle in relation to noise reduction is achieved.

A jalousie frame consisting of, among others, outer housing ring 3 and inner supporting ring 4 is manufactured preferably out of, for example, four individual 90°-jalousie sectors 30 to 33 corresponding to the representation in FIG. 4, which are coupled after insertion of the fins 2,22 into a ring-shaped composite jalousie through coupling elements.

Figure 5:
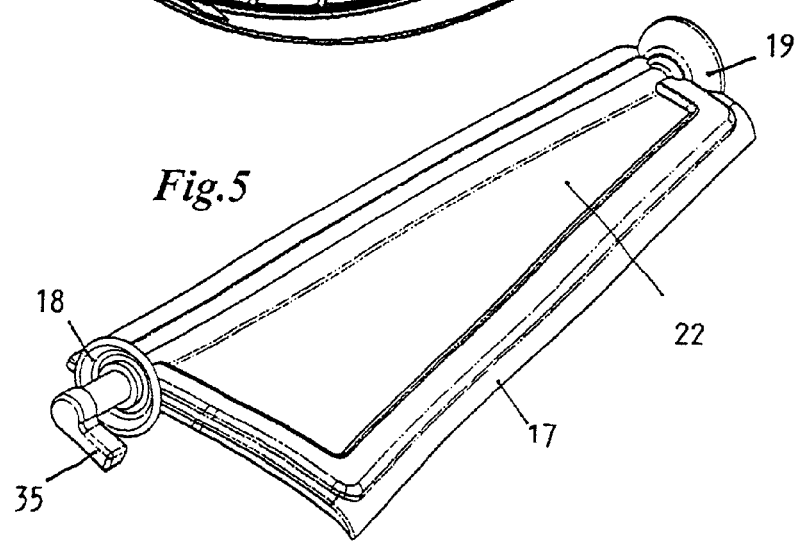

Besides, a freely rotatable fin 22 is provided for each jalousie sector 30 to 33, which, due to its asymmetrical form shown in FIG. 5, rests against the adjacent limiting element 34 tight with its elastic edge 17 through gravity for the adjustment of the jalousie 1 in a preferably vertical plane. Besides, the freely rotatable fins 22 are arranged at an end area of each of the four 90°-jalousie sectors respectively so that two diametrically and horizontally running pairs of freely rotatable fins 22 arise respectively according to their connection with each other to a ring-shaped jalousie 1 corresponding to the illustration in FIG. 4.

For the limitation of the swivelability of these fins 22, a stop lever 35 is formed at their ends corresponding to the embodiment according to FIG. 5.

However, in the preferred embodiment of the invention corresponding to the representations in FIG. 10 to FIG. 13, the freely rotatable fins 22 can be swivelled freely depending on the angular position or the adjusted position of the adjusting ring 13 or 45, i.e., if this does not hold all fins 2, 22 in opened position.

Figure 12:
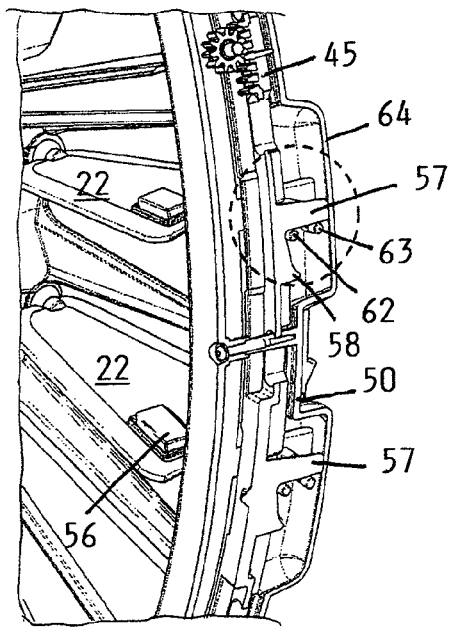

The representation in FIG. 12 shows that the fins 22 are held in fully opened swivelled position by means of a dog 57. The adjusting ring 45 reaches the corresponding adjusting position, if the continuously controlled fins 2 have also to be swivelled to fully opened position.

The maximum cross section of the engine cooler is available even during standstill of the vehicle and high cooling requirement of the vehicle engine through this possible locking of the otherwise freely rotatable fins 22 together with the continuously controlled fins 2 in completely opened position.

In addition to the dog 57 provided for the holding of the fins 22 in opened position, the adjusting ring 45 carries a follower 58 on its circumferential area at a distance from this in the area of the fins 22. The fins 22 are moved a little by this corresponding to the representation in FIG. 10 each time when the other continuously controlled fins 2 are moved between open and closed position. In this way, it is ensured that the easy movability of the fins remains maintained upright.

For the mentioned contact with the fins 22 of the dog 57 and follower 58 of the adjusting ring 45 provided on the adjusting ring 45, these carry at the free end of their main journal 59, for example, two cam levers 60, 61 running into each other v-shaped, which carry a cam pin each 62, 63 at their outer end.

The representation according to FIG. 12 shows how an otherwise freely rotatable fin 22 is held in opened position through the attachment of two cam pins 62, 63 at the dog 57 of the adjusting ring 45.

Figure 13:
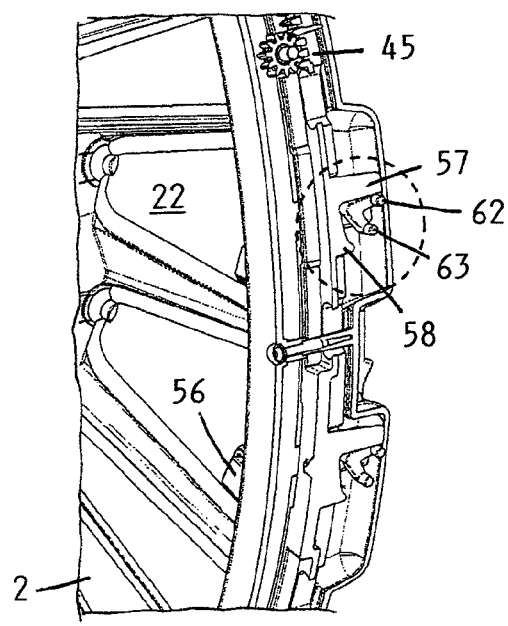

The FIG. 13 shows an adjusted position of the adjusting ring 45, in which the fins 22 can be swivelled freely through air flow, but however remain in closed position due to poor flow through its weight 56.

Figure 10:
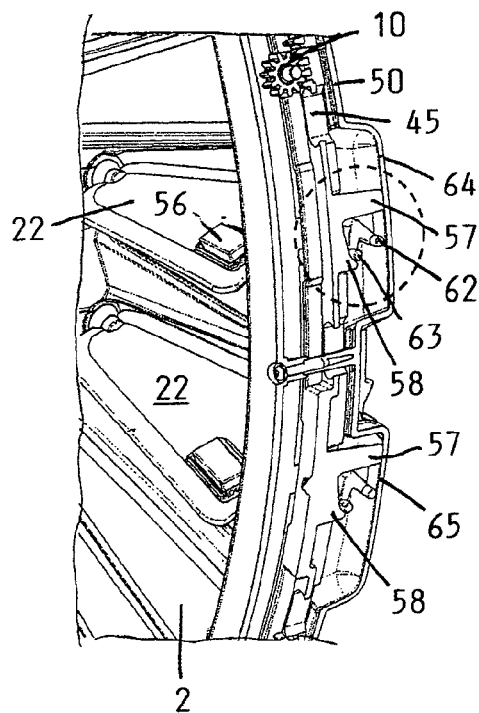
Figure 11:
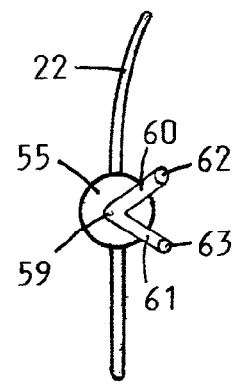

For the sealing influence of the cam levers 60,61 of the fins 22 with their cam pins 62,63 as well as the dog 57 and the follower 58 of the adjusting ring 45, the chamber ring 50 containing the adjusting ring 45 and the toothed steering heads 10, e.g., represented in FIG. 10 only in section, has chamber bulges 64, 65 which are dimensioned properly for this.

Figure 15:
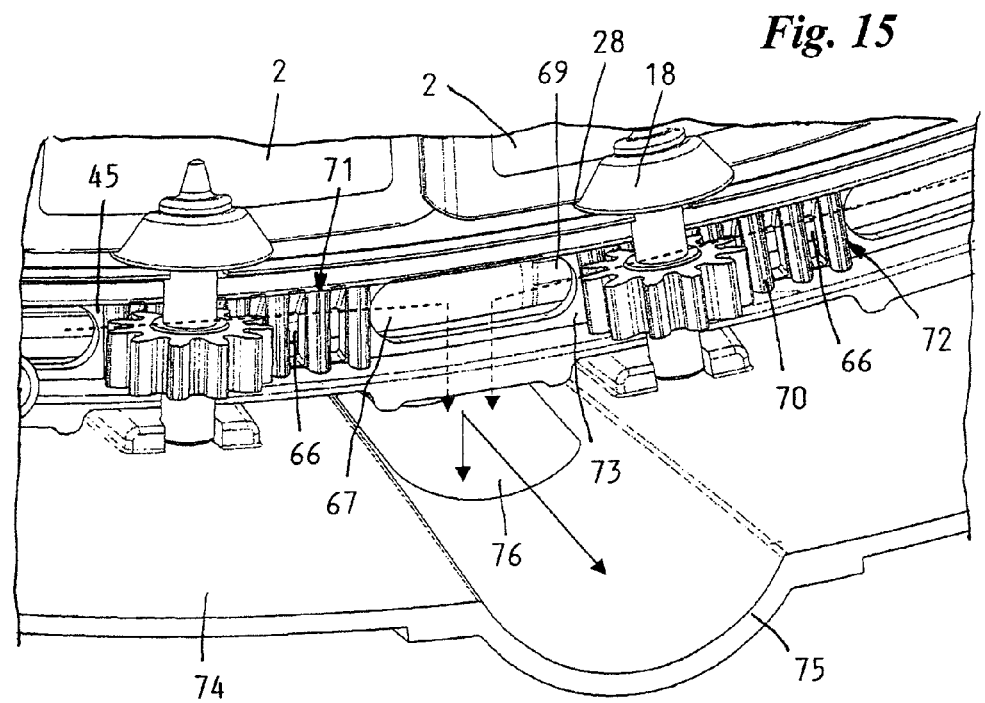

As described before, based on the embodiments of FIG. 3 and FIG. 9 among others, the steering heads 10 of the fins and the adjusting ring 13, i.e., the counter engagement and engagement means are contained in a circumferentially extending hollow space 49 protected outwards and consequently sealed against ingress of contaminations. In order to achieve that the fine dust or other foreign substances ingressed in spite of that leave the hollow space 49 again cleaning automatically before the swivel drive of the fins can become obstructed, this circumferentially extending hollow space 49 is connected to a channel 68 circumferentially extending around parallel to it and opening to an exit area at least in the lowest area of the jalousie through several openings 66, 67, corresponding to FIG. 2, or 69, corresponding to FIG. 8 and FIG. 15.

Such openings 66,67 are provided for the embodiment according to FIGS. 8 and 9 respectively in the gaps between the teeth 70 of the rows of teeth 71,72 of the adjusting ring 45 and additionally between the rows of teeth 71,72 in a profile wall 73 of the adjusting ring. Consequently, for the embodiment according to FIGS. 8 and 9, contaminants can avoid the channel 69 formed through the hollow profile of the adjusting ring 45 and trickle out or run out within the same up to the floor area of the jalousie. A drainage groove 76 is provided there in the outer circumferential wall 74 of the housing ring 47 axially directed with reference to the jalousie in the form of a wall bulge. Its open end is opened on the outflow side in relation to the flow through the jalousie 1 so that the air flowing outside below the engine cooler shroud 5 ejects out the contaminant accumulated there. Moreover or instead of that, an opening 76 can be provided there in the floor area.

Figure 2:
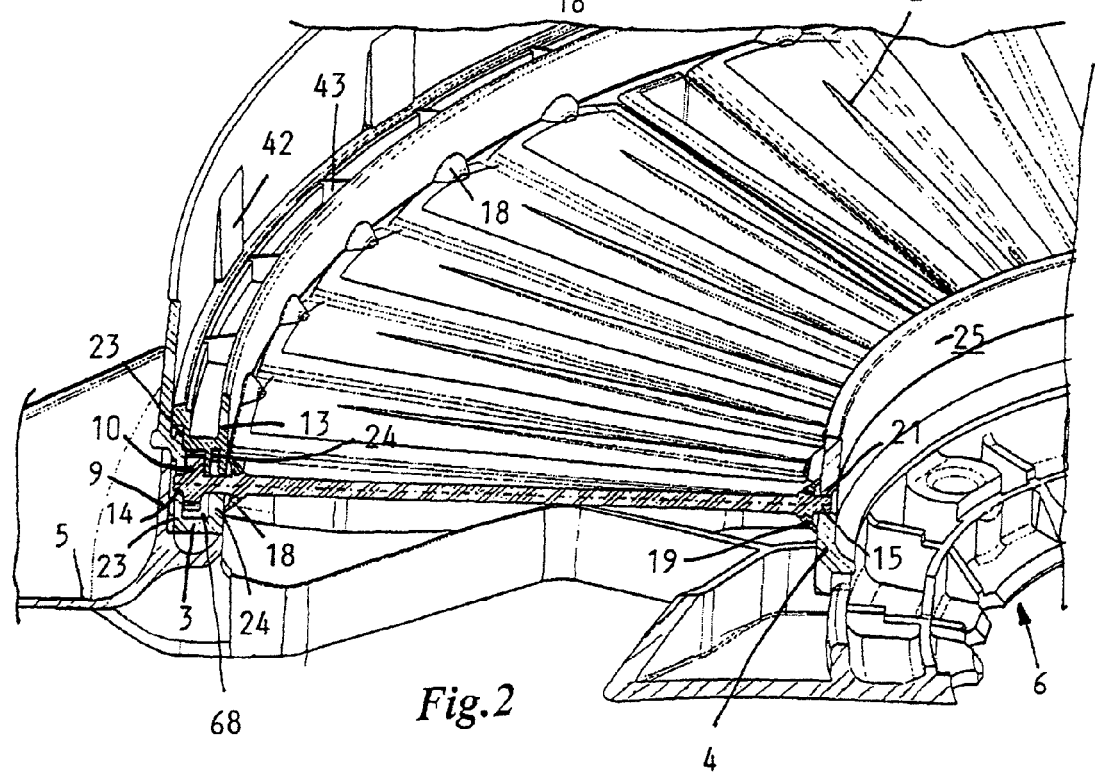
Figure 3:
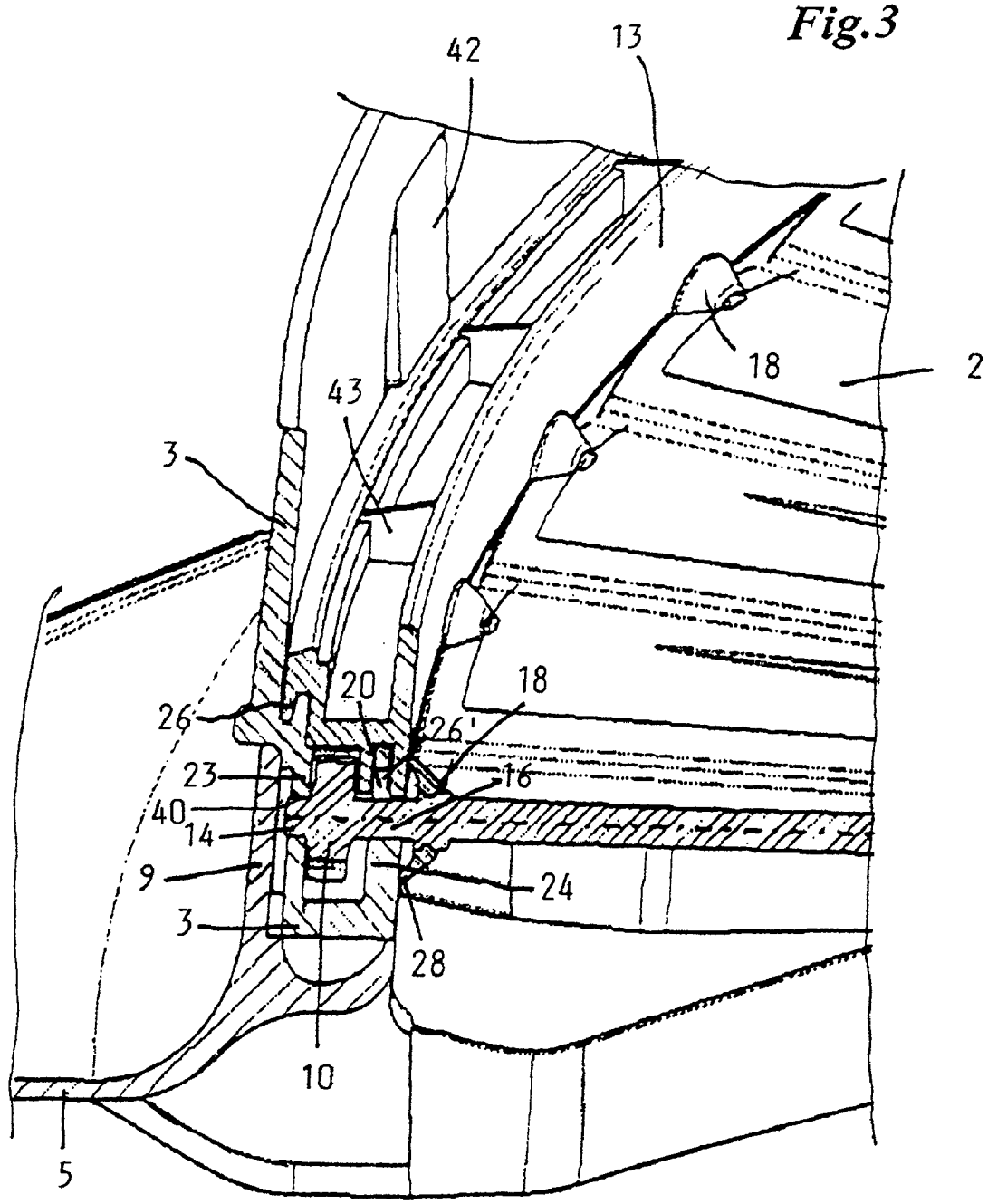

It is understood that in a similar manner such a self-cleaning function can also be provided for the embodiment of a jalousie according to the invention corresponding to the representations in FIG. 2 and FIG. 3, in which openings, not illustrated, are provided in the outer cross-sectional side 23 of the housing ring 3.

The invention claimed is:

1. Jalousie for controlling the airflow through an engine cooler of a vehicle, whose fins (2,22) are supported swivel-mounted in an outer housing ring (3,47), which is provided for connection to the engine cooler of the vehicle, on one side and in an inner supporting ring (4) on the other side, whereat the fins (2) have at one of their ends counter-engaging means (10) for engaging means (11,46) for their swivel drive, which are provided in a circumferentially extending adjusting ring (13,45) movable in circumferential direction, and wherein the counter-engaging means (10) and the engaging means (11, 46) are enclosed on all sides in a common hollow space (49) circumferentially extending along the adjusting ring (13,45).

2. Jalousie according to claim 1, wherein a larger number of the fins (2) are rotatable between a maximum opened and a fully closed position through a continuous mechanical coupling with a servo drive controlled through a signalling device and a smaller number of the fins (22) are supported freely rotatable in the airflow of the vehicle, independent of such coupling wherein they are rotatable into a closed position under their own excentric weight or an external weight (56).

3. Jalousie according to claim 2, wherein the freely rotatable fins (22) can be swivelled freely depending on the angular position or the adjusted position of the adjusting ring (45), in which a dog (57) is provided on the adjusting ring (45) for each rotatable fin (22) and at least one cam (62, 63) is provided on the freely rotatable fins (22) in such a way that the dog (57) rests against at least one of the cams (62, 63) in one of the opened fins (2) corresponding to the adjusted position of the adjusting ring (45) in such a way that the corresponding fins (22) are locked in the opened position.

4. Jalousie according to claim 2, wherein at least one cam (62, 63) is provided on the freely supported fins (22) that can be swivelled and a follower (58) is provided on the adjusting ring (45) in the area of these fins (22) so that the follower (58) abuts against the cam (63) during an adjusting movement of the fins (2) that are in continuous engagement with the adjusting ring (45).

5. Jalousie according to claim 1, wherein the circumferentially extending hollow space (49) is limited by a channel-shaped cross-section area both of the housing ring (47) as well as of a chamber ring (50).

6. Jalousie according to claim 1, wherein the circumferentially extending hollow space(49) enclosing the counter-engaging means (10) and engaging means (11,46) is connected to a channel (69) circumferentially extending around in parallel to it and opening into an exit area (75, 76) at least in the lowest area of the jalousie through several openings (66,67).

7. Jalousie according to claim 1, wherein the engaging means (11,46) of the adjusting ring (13,45) consist of teeth (70) in series in circular direction, which are in continuous, intermeshing engagement with a toothed engaging area (12) running in the form of an arc of a circle of a steering head (10) forming a counter-engaging means, which is thus provided on the mechanically coupled fins (2).

8. Jalousie according to claim 7, wherein openings (66) are provided in the gaps between the teeth (70) of series of teeth (71,72) of the adjusting ring (45).

9. Jalousie according to claim 8, wherein at least one opening (67) is provided between the rows of teeth (71,72) in a profile wall (73) of the adjusting ring (45).

10. Jalousie according to claim 1, wherein a sealing collar (18, 19; 55) is provided at ends of the fins (2,22) respectively covering its bearing area and butting against the housing ring (3, 47) and the supporting ring (4) with a sealing lip (28).

* * * * *